(12) United States Patent
Klein et al.

(10) Patent No.: US 8,942,981 B2
(45) Date of Patent: Jan. 27, 2015

(54) NATURAL LANGUAGE CALL ROUTER

(75) Inventors: Veronica Klein, Piscataway, NJ (US); Deborah Washington Brown, Alpharetta, GA (US)

(73) Assignee: Cellco Partnership, Basking Ridge, NJ (US)

( * ) Notice: Subject to any disclaimer, the term of this patent is extended or adjusted under 35 U.S.C. 154(b) by 629 days.

(21) Appl. No.: 13/284,276

(22) Filed: Oct. 28, 2011

(65) Prior Publication Data
US 2013/0110510 A1 May 2, 2013

(51) Int. Cl.
*G10L 15/18* (2013.01)
*G10L 15/26* (2006.01)

(52) U.S. Cl.
CPC ............ *G10L 15/26* (2013.01); *G10L 15/1815* (2013.01); *G10L 15/1822* (2013.01)
USPC ............... 704/257; 704/251; 704/254; 704/9; 704/235; 704/270; 455/146; 455/511

(58) Field of Classification Search
CPC . G10L 15/183; G10L 15/197; G10L 15/1822; G10L 15/193; G10L 15/26; G10L 15/063; G10L 15/08; G10L 15/18; G10L 15/1815; G10L 15/19; G06F 17/2705; G06F 17/2715; G06F 17/2775; G06F 17/2785; G06F 17/2872; G06F 17/30899; H04M 2201/40; H04M 3/493; H04M 3/5166

USPC .......... 704/257, 251, 254, 270.1, 270, 9, 235; 379/121.01, 220.01, 221.09, 88.03, 379/229, 88.01, 221.12, 221.02, 265.11, 379/211.02, 265.02, 120, 127.01, 216.01; 370/392; 455/146, 511
See application file for complete search history.

(56) References Cited

U.S. PATENT DOCUMENTS

| | | | | |
|---|---|---|---|---|
| 6,178,396 | B1 * | 1/2001 | Ushioda | 704/9 |
| 7,092,888 | B1 * | 8/2006 | McCarthy et al. | 379/88.01 |
| 7,143,040 | B2 * | 11/2006 | Durston et al. | 704/270 |
| 7,275,033 | B1 * | 9/2007 | Zhao et al. | 704/255 |
| 7,882,437 | B2 * | 2/2011 | Bodin et al. | 704/270.1 |
| 8,515,736 | B1 * | 8/2013 | Duta | 704/9 |
| 2004/0030695 | A1 * | 2/2004 | Lyudovyk et al. | 707/6 |
| 2005/0228657 | A1 * | 10/2005 | Chou et al. | 704/225 |
| 2006/0122834 | A1 * | 6/2006 | Bennett | 704/256 |
| 2009/0055184 | A1 * | 2/2009 | Hebert | 704/257 |
| 2009/0157406 | A1 * | 6/2009 | Iwaki et al. | 704/258 |

* cited by examiner

Primary Examiner — Vijay B Chawan (57) ABSTRACT

A natural language call router forwards an incoming call from a caller to an appropriate destination. The call router has a speech recognition mechanism responsive to words spoken by a caller for producing recognized text corresponding to the spoken words. A robust parsing mechanism is responsive to the recognized text for detecting a class of words in the recognized text. The class is defined as a group of words having a common attribute. An interpreting mechanism is responsive to the detected class for determining the appropriate destination for routing the call.

18 Claims, 4 Drawing Sheets

NATURAL LANGUAGE CALL ROUTER

TECHNICAL FIELD

The present subject matter relates to a natural language call router that recognizes caller's words expressed in plain language and routes the respective call to a proper destination based on the recognized words.

BACKGROUND

A natural language call router allows callers to state what they want in plain language as they would to a real person. Based on what the callers said, their calls are routed to the appropriate destinations. Natural language call routers consist of two major components—the recognizer and the classifier. The purpose of the recognizer is to determine the sequence of words a caller has spoken. The classifier takes this sequence of words and assigns one of a set of fixed meanings (or destinations) to that sequence. Then, the respective application routes the call to the determined destination.

Typically, the recognizer is implemented with a statistical language model (SLM). The SLM combines acoustic information from the caller's speech with a statistical model representing the likelihood of different word sequences, to determine the sequence of words spoken by the caller.

The classifier is typically implemented in one of the following ways:
 as a program written in some programming language;
 as a robust parsing grammar that looks for certain key words and phrases, the robust parsing grammar would need to be augmented by some type of program to determine how the key words map onto destinations; and
 as a Statistical Semantic Model (SSM) that determines how the statistical patterns of human word usage can be used to figure out what people mean.

In a rapidly changing environment, the types of things that callers may say also change rapidly. Therefore, there is a need to quickly and easily change both the SLM and the classifier of the call router to accommodate those changes. None of the three types of classifiers discussed above satisfies this need. Because of the many possible sequences of words that can be generated by the recognizer, changing a program can be complicated. The same disadvantage applies to the robust parsing grammar/program combination. Changing the SSM involves the manual retagging of possibly tens of thousands of transcribed callers' utterances and then the retraining of the SSM based upon the new tagging. This training process often requires many hours of compilation time.

Hence, the need exists for a natural language call router operating based on the grammar that can be easily modified with little manual intervention, and can be recompiled within a short time.

SUMMARY

The teachings herein offer an effective technique for recognizing words of a caller spoken in natural language so as to route a call from that caller to an appropriate destination.

An exemplary call router configured for routing an incoming call from a caller to a determined destination utilizes a telephone interface for receiving a speech signal representing words spoken by a caller, and a speech recognizer responsive to the speech signal for producing recognized text corresponding to the spoken words. A robust parser is responsive to the recognized text for detecting a class of words in the recognized text. The class is defined as a group of words having a common attribute. An interpreter is responsive to the detected class for determining the destination for routing the call.

The robust parser may detect multiple classes of words in the recognized text. The classes may be represented by types of classes including action, device, product and feature. The classes may be assigned with different priorities. The robust parser may detect the classes based on compiled class definitions including words relating to each class.

The interpreter may determine the destination in accordance with a rule that defines a destination based on a combination of the detected classes. The rule may be selected from among multiple rules that define destinations for different combinations of classes. The rule may be selected based on a count corresponding to sum of weights assigned to the classes defined in the rule.

The speech recognizer may recognize the words using a class-based statistical language model (SLM) trained based on the class definitions.

For example, the call router may be implemented on a computer platform including a central processing unit (CPU) and a memory for storing program instructions for executing by the CPU, including the speech recognizer, the robust parser and the interpreter.

Aspects of the technology discussed in more detail below may also take the form of a program product, such as an article of manufacture. Such an article comprises a machine readable storage medium; and executable code for a call router embodied in the medium. Execution of the code by a processor causes the call router to implement its functions.

In an example of one such article, execution of the code causes the call router to implement functions including recognizing words spoken by a caller in a natural language to produce recognized text, detecting classes of words in the recognized text, where each class is defined as a group of words having a common attribute, and determining a destination for routing the call in accordance with a rule that defines a destination based on a combination of the detected classes.

Also, execution of the code may cause the call router to select the rule from among multiple rules defining destinations for different combinations of classes. The classes may be represented by types of classes including action, device, product and feature, and may be detected based on class definitions including words relating to each class.

Another aspect of the subject matter discussed below involves a method of routing a call from a caller to a determined destination, comprising recognizing words spoken by a caller in a natural language to produce recognized text, detecting classes of words in the recognized text based on class definitions for each class including a group of words having a common attribute, and determining a destination for routing the call in accordance with a selected rule that defines a destination based on a combination of the detected classes.

The method may further comprise assigning a weight to each class and calculating a weight of the rule based on the weight of the classes included in the rule. The selected rule may be determined based on the weight of the detected classes.

The method may also include assigning priorities to each class, and computing the weight of a class based on a priority assigned to that class.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 1:
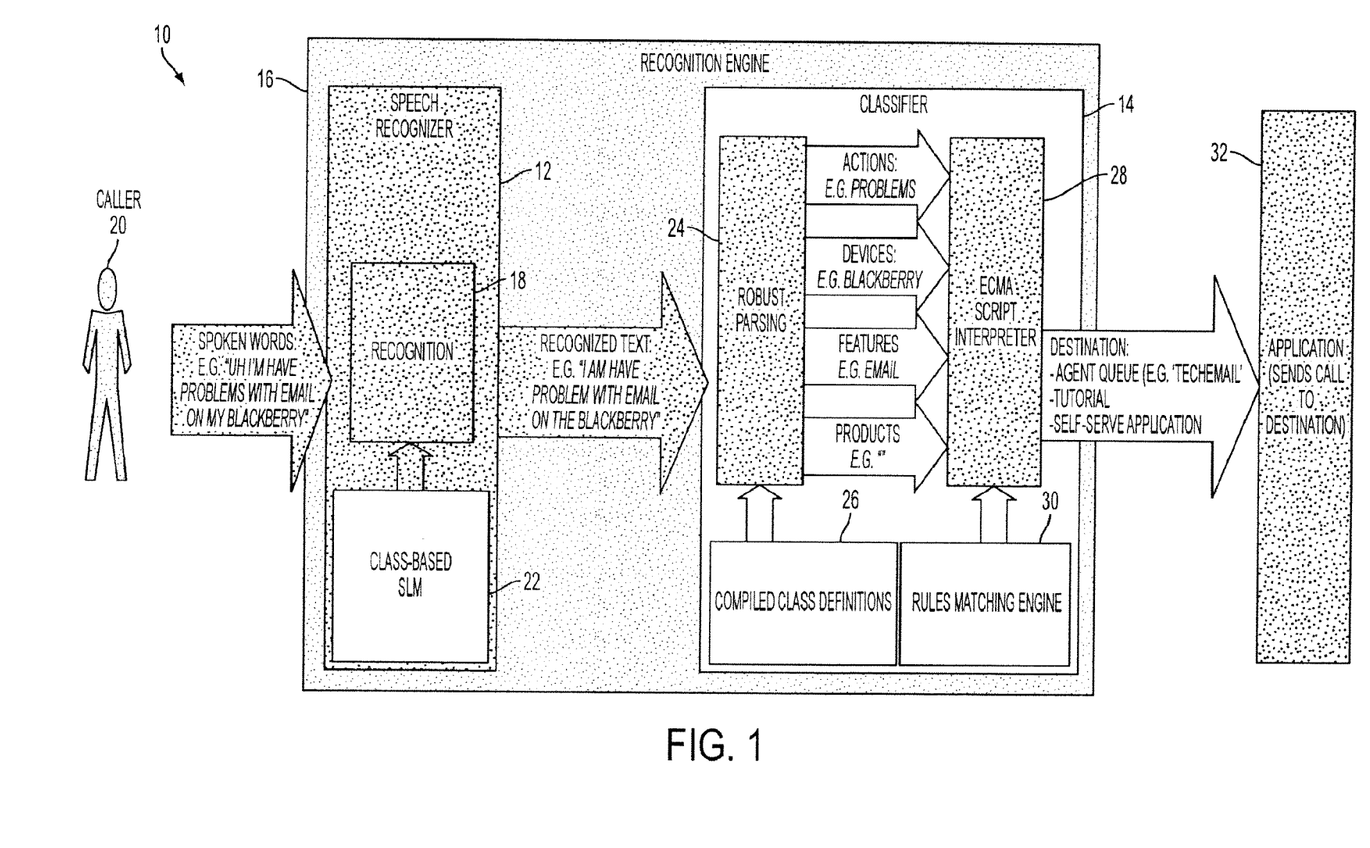
FIG. 1 is a simplified block diagram illustrating exemplary functional elements involved in implementing a natural language call router of the present disclosure.

FIG. 1 is a simplified block diagram illustrating an exemplary embodiment of a natural language call router 10 in accordance with the present disclosure. For example, the call router 10 may be implemented by a wireless telephone service provider to route telephone calls received from customers allowed to state reasons for their calls in plain language. The call router 10 includes a speech recognizer 12 and a classifier 14 that may be implemented as elements of a recognition engine 16. As discussed in more detail below, the speech recognizer 12 may run a speech recognition software application 18 to determine a sequence of words spoken by a caller 20. A class-based statistical language model (SLM) 22 tunes the speech recognition application 18 to particular grouped words/sentences the caller 20 is likely to say. The class-based SLM 22 is generated using statistical representation based on particular classes. Instead of dealing with separated words, the class-based SLM 22 groups words in particular classes and analyzes the classes.

Each class combines a group of words having a common attribute. For example, four types of classes may be provided—actions, devices, features and products. The class may be a non-empty collection of synonyms for describing the same type of action, device, product or feature. The actions may include the words relating to particular requests or problems expressed by the caller 20, such as a request for telephone set activation, cancellation of service or technical problems. The devices may include the words identifying specific devices, such as Blackberry™, Motorola Droid™ or iPhone™, or specific device elements. For example, a class PARTOFPHONE defined for devices may include parts of a phone, e.g. "keyboard," "speaker," and "earpiece." The features may include the words identifying the features offered by the wireless telephone service provider, such as e-mails, text messaging, voice or data communications. The products may include the words identifying the products offered by the service provider, such as 3G or 4G products, hearing aid compatible products or Video Relay Service (VRC).

Each class may have a name, type and a set of non-empty phrases. Additionally, each class may be assigned with one of two or more priorities—such as primary or secondary priority. Primary classes provide substantial meaning to a phrase when they appear with other classes in the same phrase. By contrast, secondary classes provide little extra meaning to the phrase. For example, the SLM 22 defines classes HELP, PHONE, OPERATOR, SERVICE as secondary classes.

The speech recognizer 12 produces recognized text based on the words spoken by the caller 20. For example, the caller 20 may say "uh, I'm having problems with email on by blackberry." In response the speech recognizer may produce the recognized text "I am having a problem with email on the blackberry." The recognized text is supplied to the classifier 14. The classifier 14 includes a robust parser 24 for analyzing the recognized text. In particular, the robust parser 24 may be a software application or module that identifies multiple types of classes, such as the four types of classes above: actions, devices, features, and products. The robust parser 24 operates based on compiled class definitions 26 that may define the four types of classes discussed above. The identified classes are processed by an ECMA script interpreter 28 which may be a software application that executes class-specific code written in the ECMA scripting language, such as JavaScript, to determine an appropriate destination for routing the call from the caller 20. The ECMA script interpreter 28 operates based on a rules matching engine 30 that sets the destination for the call based upon combinations of classes identified by the robust parser 24. For example, the destination may be an agent queue for connecting to a live agent, a tutorial for providing information requested by the caller or a self-serve application that enables the caller to obtain a requested service on her own. The destination determined by the ECMA script interpreter 28 is provided to a destination application 32 that executes operations required to route the call to the determined destination.

Figure 2:
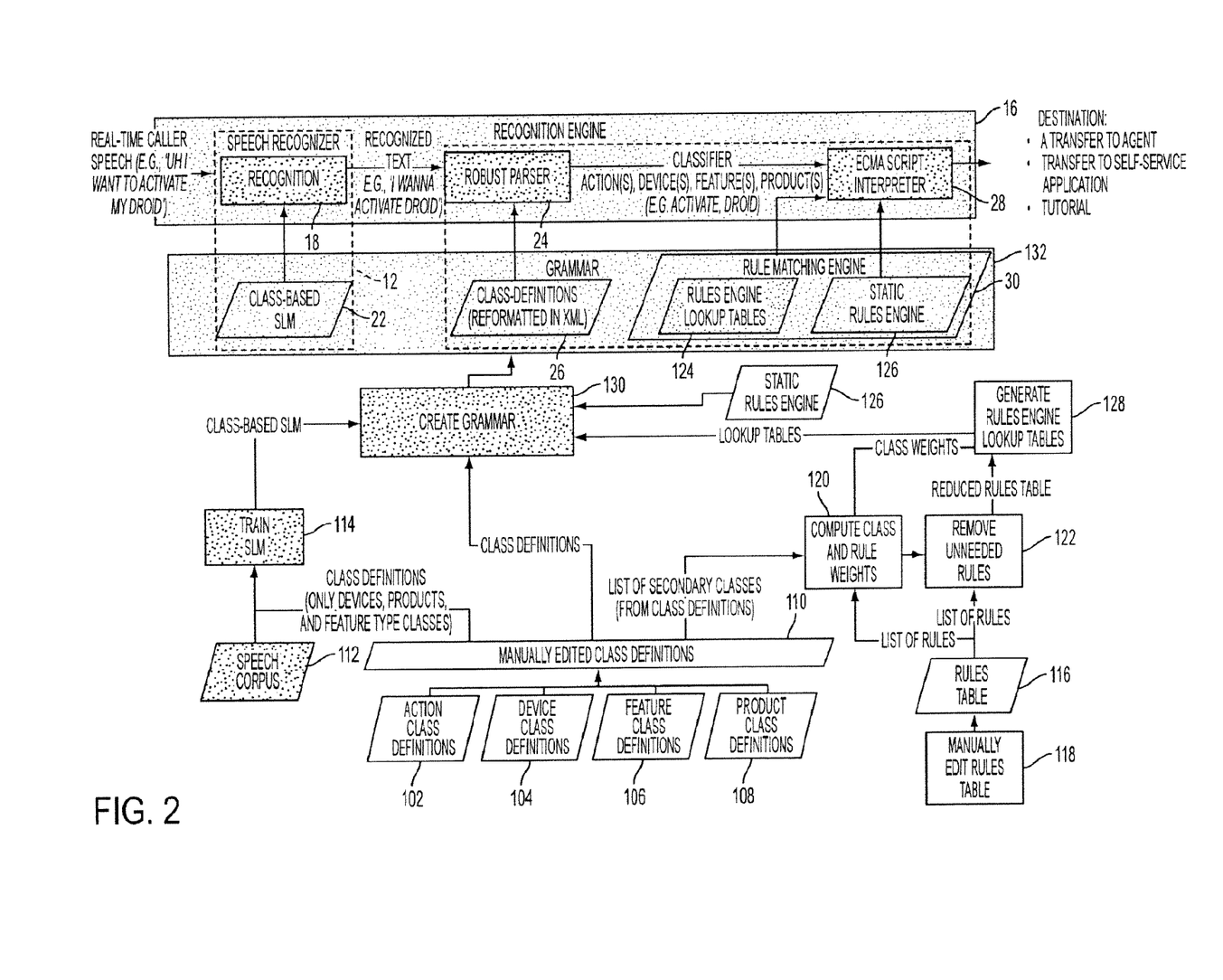
FIG. 2 is a block diagram illustrating an exemplary call router and exemplary procedures involved in creating a grammar for the call router.

FIG. 2 illustrates operations of the natural language call router 10 and procedures involved in creating the grammar used by the call router 10. The compiled class definitions 26 discussed above include class definitions for each type of class-action class definitions 102, device class definitions 104, feature class definitions 106 and product class definitions 108. The classes may be defined manually according to business needs or as a result of analysis. The action type classes may remain relatively static. However, the device type classes, product type classes, and feature type classes may be modified as desired (e.g., often compared with other classes) based on business and marketing initiatives. The set of secondary classes may also remain relatively static. As devices, products, and features are added, they may be defined as primary classes.

An example below shows exemplary classes of different types presented in a text file:

Name:Type:Phrases:Priority

DROID:device:droid,android,droid x, droid 2, bionic:Primary

ACTIVATE:action:activate,activation,activating,turn on:Primary

CANCEL:action:cancel,canceled,canceling,stop,stopped, remove,removing:Primary

HELP:action:help,assistance, aid:Secondary

OPERATOR:action:customer service,representative, agent,service representative,rep:Secondary PHONE:device:phone,telephone,cell phone,phones,telephones,cell phones:Secondary TEXT:feature:text,text message,texting,messages:Primary VOICEMAIL:feature:voicemail:Primary EMAIL:feature:email:Primary The order of words within a particular element of a class may be defined. For instance, in the class ACTIVATE shown above, "turn on" is defined as a member of the class. However, "on turn" is not considered to be a member of this class. Words that are not identified as part of any class may be ignored. Duplicates may be treated as if only one occurrence appeared. For example, in the sentence, "I want to turn on I mean activate my phone", the action ACTIVATE appears twice ("turn on", "activate"). This may be counted as a single occurrence of the class ACTIVATE. Definitions of classes can be manually edited (block 110) whenever new devices, products, services and features are introduced or retired. Updates can be made quickly, a substantial improvement compared with the amount of time required to generate a Natural Language Understanding (NLU) grammar in conventional natural language call routers.

The call router 10 may utilize a speech corpus 112, which is a collection of spoken audio files and their transcriptions required to build the call router grammar. The transcriptions may be entered manually. They may be used to build the SLM 22, which is used by the speech recognizer 12. The speech corpus 112 may consist of several tens of thousands of audio samples. An audio file may have no transcription due to background noise detection. Such a file may be excluded from the speech corpus 112.

Further, the call router 10 may include a "train SLM" program 114 run based on the definitions of the classes and the speech corpus. The program 114 implements training so as to produce the class-based SLM 22 that assigns probabilities to sequences of words and classes based on the number of occurrence of those sequences in the speech corpus 112. For example, the SLM 22 may be applied to the following types of classes: device, feature, product.

A rules table 116 contains rules that set the destinations determined by a combination of classes in the rules. Each rule may contain zero or more action classes, zero or more device classes, zero or more product classes, and zero or more feature classes. Each combination of classes determines a separate rule. Each rule has only one destination. The size of a rule is the number of classes it contains.

For example, the rule TechEmail having a size equal to 4 is defined by the action class ACTIVATE, the device class DROID, and two feature classes EMAIL and TEXT. The destination determined by this rule is the TechEmail queue that indicates that a call should be forwarded to an agent corresponding to that queue.

Another exemplary rule TechDroid having a size equal to 2 is defined by the action class ACTIVATE and the device class DROID. The call destination for this rule is identified as TechDroid.

Entries in the Rules Tables can be manually added, deleted, or modified (block 118) to reflect the introduction of new devices, features, or products, or to reflect changes in how combinations of actions, devices, products, and features should be treated, for example, changes to the destination to which the call should be routed.

Each class and rule is assigned with a weight calculated in block 120. Weights are assigned to classes with the following constraints:

1) The weight for a class is a real number that is strictly less than $1+1/n$, where n is the size of the largest rule in the rules table.

2) All secondary classes are assigned the weight of 1.

3) All primary classes are assigned weights greater than 1.

4) If a primary class A appears in more rules than a primary class B, then weight for class A must be less than or equal to the weight for class B The rule weight is the sum of the weights for the rule's component classes. For example, if HELP has been defined as a secondary class, and ACTIVATE, DROID, EMAIL, and TEXT have been assigned the weights 1.01, 1.01, 1.02, and 1.01, respectively, then for the rule defined by classes HELP, ACTIVATE, DROID, EMAIL and TEXT, the weight is $1+1.01+1.01+1.02+1.01=5.05$.

The restrictions on assigning the class weight guarantees that the rule weight is greater than or equal to the size of the rule, but strictly less than one plus the size of the rule. This approach differs from the traditional method where assigning weights in SLMs are computed from the speech corpus and can take many hours of machine time to compute. Calculating rule weights in accordance with the present disclosure is based on the list of rules and not the size of the speech corpus. It provides the ability to operationally maintain content of the grammar if classes need to be added, updated or deleted.

To increase the efficiency of the rules engine, rules that are not needed are removed (block 122). Depending upon the weights assigned to classes and rules, only a subset of rules from the rules table may be evaluated at run-time to remove the rules. For any combination of action classes, device classes, product classes, or feature classes, the rules matching engine 30 may produce the same destination using the reduced set of rules as it would for the original set of rules. The rules are eliminated as follows:

1) the reduced rules table is set to include all the rules in the rules table;

2) all rules of size 2 or greater into ascending order according to size;

3) for each rule R in the sorted list
   i. the list of sub-rules of R that are in the Reduced Rules Table is determined, this list is called SUBRULES(R);
   ii. If SUBRULES(R) is not empty,
      1. the maximum weight of the rules in SUBRULES(R) is determined,
      2. the list of rules in SUBRULES(R) which have that weight is determined, this list is called MAXSUBRULES(R);
      3. if every sub-rule in MAXSUBRULES(R) has the same destination as R, then R is removed from the Reduced Rules Table.

As a result, the reduced rules table contains a smaller set of rules that is equivalent to the original rules table.

The rules matching engine 30 may be a software program that runs in real time. It determines the destination of the call based upon the action classes, device classes, product classes, and/or feature classes identified by the robust parser 24. The rules matching engine 30 includes rules engine lookup tables 124 and a static rules engine 126.

A set of rules engine lookup tables 124 is created based on the reduced rules table, class definitions and the class weights (block 128). The tables 124 contain the following information.

1) For each class:
   a. The list of rules in which that class appears;
   b. The weight for the class;
   c. The type of class (i.e., action, device, product, feature).

2) For each rule:
    a. The size of the rule;
    b. The destination of the rule.

Each class may be associated with a piece of code written in the ECMA scripting language. That piece of code assigns values to variables that store weight of the class, a list of rules for that class, the sizes of those rules, and the destinations of those rules.

The following example is a program fragment that is generated for the ACTION class 'ACTIVATE':weight=1.02; rules=[23.3,15.1,7.2];destns=['SalesActivation','TechGeneral', 'TechDroid']

In this example, the program assigns the value 'action' to the type of the class. It gives a weight of 1.02 to the class. It says that the class appears in rules 23, 15, and 7 and that the sizes of these rules are 3, 1, and 2, respectively. The rules have destinations SalesActivation, TechGeneral, and TechDroid, respectively.

The static rules engine 126 is the portion of the rules matching engine 30 that does not change. It may be implemented as a software program written in the ECMA scripting language to determine the destination for the most relevant rule. An exemplary algorithm illustrating operations of the static rules engine 126 is presented in FIG. 3 and will be described later.

Class definitions 26 are formatted into an Extensible Markup Language (XML) document. In block 130, the class definitions 26 may be combined with the SLM 22, the code of the static rules engine 126 and the lookup tables 124 into a single file, and compiled using a conventional compilation software to create a grammar 132 for the recognition engine 16. The grammar may be implemented as a binary file. An exemplary excerpt from the grammar (before compilation) for the action class ACTIVATE is presented below:

```
<rule id='action'>
  <one-of>
  <item> activate
    <tag>value='ACTIVATE';weight=1.02;rules=[2.4,3.2,4.1];
       mappings=['TechEmail','TechDroid','SalesActivation']</tag>
    </item>
  <item> activating
    <tag>value='ACTIVATE';weight=1.02;rules=[2.4,3.2,4.1];
       mappings=['TechEmail','TechDroid','SalesActivation']</tag>
    </item>
  <item> activation item> activation
  <tag>value='ACTIVATE';weight=1.02;rules=[2.4,3.2,4.1];
       mappings=['TechEmail','TechDroid','SalesActivation']</tag>
    </item>
  <item> turn on item> turn on
  <tag>value='ACTIVATE';weight=1.02;rules=[2.4,3.2,4.1];
       mappings=['TechEmail','TechDroid','SalesActivation']</tag>
    </item>
        ...
       (OTHER DEFINITIONS OF ACTION CLASSES)
        ...
  </one-of>
</rule>
```

This fragment encodes the following information:
  'activate', 'activating', 'activation', and 'turn on' are all phrases in the action class "ACTIVATE";
  the class ACTIVATE is found in rules 2, 3, and 4;
  the sizes of those rules are 4, 2, and 1, respectively;
  those rules map onto the destination "TechEmail", "TechDroid", and "SalesActivation", respectively;
  the weight of the class ACTIVATE is 1.02.

The recognition engine 16 uses the grammar 132 to perform its operation. As discussed above, the recognition engine 16 includes the speech recognition application 18 controlled by the class-based SLM 22. The speech recognition application 18 takes digitized speech (audio) from the caller and produces a word or phrase that represents the most likely sequence of words spoken by the caller. For instance, the caller may say "uh I'd like to check I mean activate my text messages." In response, the speech recognizer 18 might produce the recognized text as "I I like to check I mean activate a text messaging".

The recognized text from the speech recognizer 18 is supplied to the robust parser 24 that based on the compiled class definitions 26 detects any action classes, device classes, product classes, and/or feature classes in the recognized text. The robust parser 24 looks for exact phrase matches of sub-phrases between the recognized text and the class definitions. For example, if the robust parser 24 receives the following phrase from the speech recognizer: "I I like to check I mean activate a text messaging," the robust parser 24 may find the following classes: ACTIVATE (i.e., activate is one of the phrases in the class ACTIVATE) and TEXT (because 'text messaging' is one of the phrases in the class TEXT).

For a given recognized text, the robust parser 24 may come up with more than one class of each type. For example, if the recognized speech is "I want to activate my text messaging and voicemail", one action class (ACTIVATE) and two features classes (TEXT and VOICEMAIL) would be found by the robust parser 24.

In response to the input from the robust parser 24, and based on information from the static rules engine 126 and rules engine lookup tables 124, the ECMA script interpreter 28 executes the class-specific rules engine program fragments and the static rules engine code. For example, the ECMA script interpreter 28 may perform the following operations:
  1) Set the destination to some default value;
  2) If there is no more output from the robust parser, send call to the destination application 32;
  3) Get the next class from the robust parser 24 (an action, device, product, or feature);
  4) Get the class-specific code from the lookup tables 124 and execute that piece of code; and
  5) Execute operations of the static rules engine 126 to determine the destination.

For example, the destination may be an agent queue for forwarding a call to a live agent, a tutorial for providing information requested by the caller or a self-serve application that enables the caller to obtain a requested service on her own. If no more classes are detected by the robust parser 24, the destination determined by the ECMA script interpreter 28 is provided to the destination application 32 that executes operations required to route the call to the determined destination.

Figure 3:
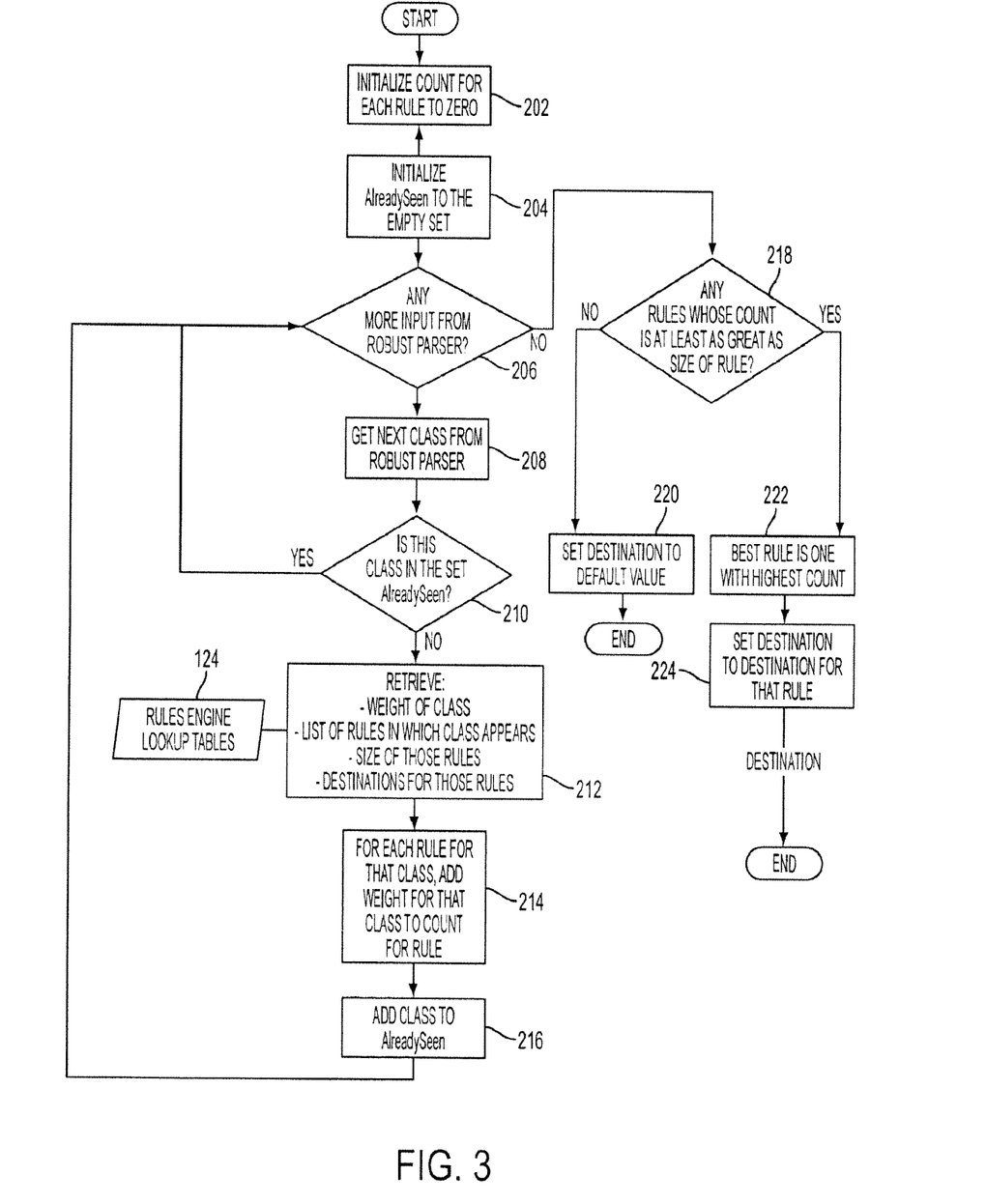
FIG. 3 is a block diagram illustrating exemplary operations of a static rule engine in FIG. 2.

FIG. 3 illustrates exemplary operations of the static rules engine 126 executed by the ECMA script interpreter 28. Initial count for each rule is set to zero (block 202). Further, the AlreadySeen field is set to the empty set (block 204). As explained below, the AlreadySeen field includes classes previously processed by the static rules engine 126. If any input is detected from the robust parser 24 (block 206), the interpreter 28 gets the class from the robust parser 24 (block 208). If this class is not in the AlreadySeen field (block 210), the interpreter 28 retrieves the following information from the rules engine lookup tables 124: the weight of the class, the list of rules in which the class appears, a size of those rules and destinations for those rules (block 212).

Based on this information, for each rule in the received class, the weight for that class is added to the count for the rule (block 214). The count for a rule is the sum of the weights of all classes that appear in the rule, provided the class was received from the robust parser in block 208. Because of the weight restrictions for classes discussed above, the count for a rule will always be less than "1+size of the rule". Additionally, the count for the rule will only be equal to or greater than the size of the rule, if every class in the rule has been received from the robust parser 24. The class is added to the AlreadySeen field (block 216), and the static rules engine 126 returns to block 206 to check whether there is any more input from the robust parser 24. If yes, operations 208-216 of the static rules engine 126 are repeated.

If no more inputs from the robust parser 24 are detected, the interpreter 28 determines whether any rule is found whose count is at least as great as the size of the rule (block 218). It is noted that the assignment of scores to weights in the class and rule weights guarantees that only rules in which all of their classes have been matched are eligible to be considered to be the rule whose count is at least as great as the size of the rule, and thus the desired rule to apply.

If no such rules are found, the determined destination transferred to the destination application 32 is set to a default value (block 220). However, if one or more rules whose count is at least as great as the size of the rule are found, the best rule is determined (block 222). The rule with the highest count is considered to be the best rule. The destination for the best rule is set as the determined destination (block 224). For example, in the recognized text: "I want to activate my android email," there are three classes: ACTIVATE, DROID, EMAIL. The following four rules may apply:

Rule 1: ACTIVATE→destinationl (size 1)
  Rule 2: ACTIVATE+DROID→destination_2 (size 2)
  Rule 3: DROID→destination_3 (size 1)
  Rule 4: ACTIVATE+EMAIL+TEXT→destinationA (size 3)

This means that if the class ACTIVATE is detected, destination 1 is determined. If the classes ACTIVATE and DROID are detected, destination 2 is determined. If the class DROID is detected, destination 3 is determined. If the classes ACTIVATE, EMAIL, and TEXT are detected, destination 4 is determined. Assuming that the classes ACTIVATE, DROID, EMAIL TEXT have been assigned weights 1.01, 1.01 and 1.02, respectively, then the counts for the rules are:

Count for Rule 1=1.01
  Count for Rule 2=1.01+1.01=2.02
  Count for Rule 3=1.01
  Count for Rule 4=1.01+1.01=2.02 (weight 1.02 is not added for the class EMAIL TEXT because the class TEXT did not appear as a part of the recognized text). According to the criteria for choosing the best rule, Rule 4 is eliminated because its count (2.02) is less than its size (3). Therefore, Rule 2 is considered to be the best rule.

Figure 4:
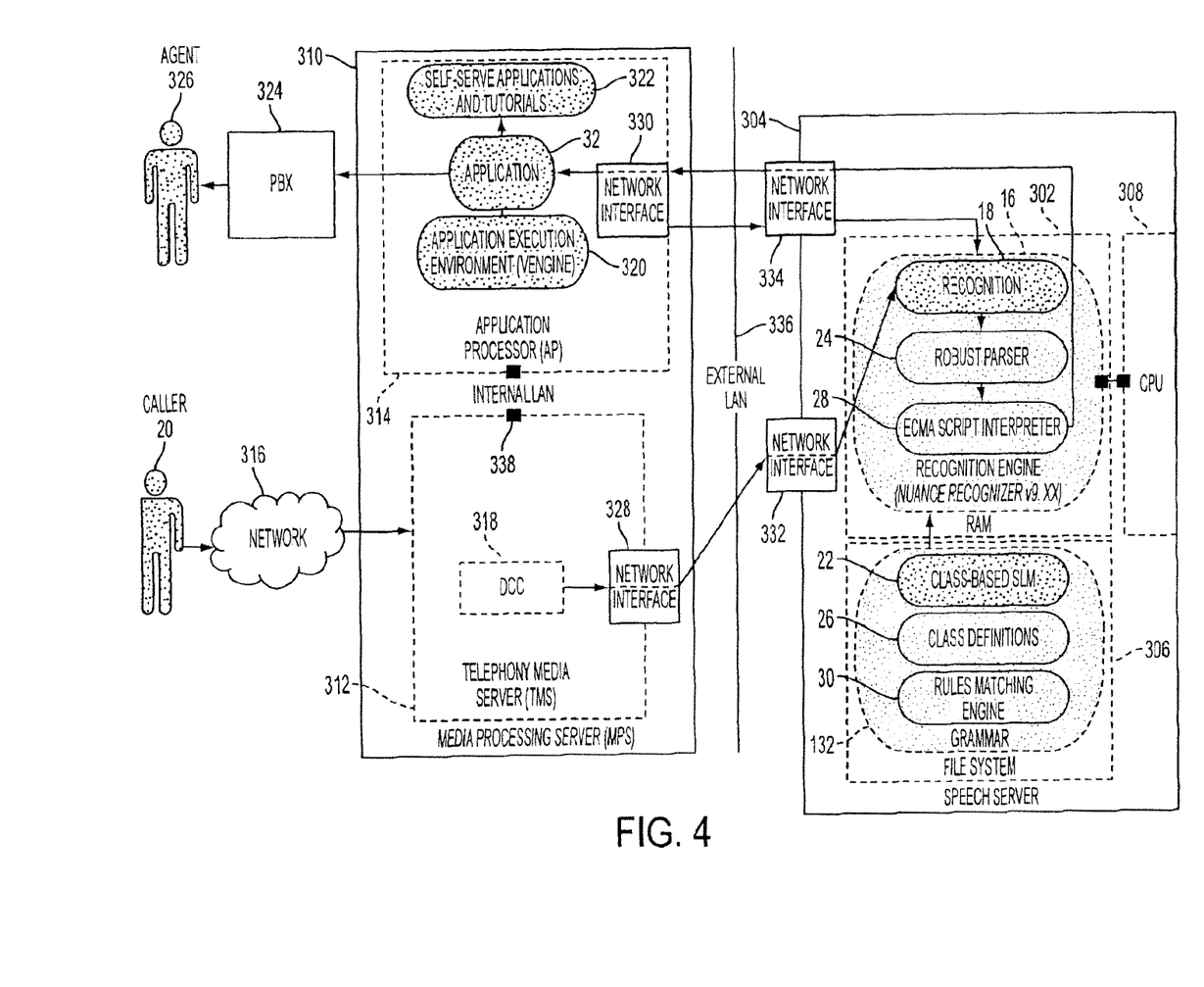
FIG. 4 is a block diagram illustrating exemplary implementation of the call router.

FIG. 4 illustrates an exemplary implementation of the natural language call router 10. At the router start-up, the software of the recognition engine 16 including the speech recognition application 18, the robust parser 24 and the ECMA script interpreter 28 may be loaded into a RAM 302 of a speech server 304, such as the AVAYA speech server. The grammar 132 including the class-based SLM 22, the class definitions 26 and the rules matching engine code 30 may in addition be loaded into the RAM 302 from a file system 306 of the speech server 304. The recognition engine 16 may be implemented based on the Nuance recognizer, which is a speech recognition software product developed by Nuance Communications, Inc.

The speech server 304 has a central processing unit (CPU) 308 for executing program instructions to operate the speech recognition application 18, the robust parser 24 and the ECMA script interpreter 28 in the manner discussed above. Also, the CPU 308 executes instructions for creating the grammar 132 including the class-based SLM 22, the class definitions 26, the rules engine lookup tables 124 and the static rules engine code 126.

A media processing server (MPS) 310 such as the AVAYA MPS, supports the speech server 304. The MPS 310 includes a telephony media server (TMS) 312 and an application processor (AP) 314. The TMS 312 includes a telephony interface for supporting communications with a mobile station of the caller 20 via a wireless network 316. Alternatively, communications via a telephone landline may be supported. Also, the TMS may include a digital command control (DCC) board 318 for decoding audio signal from the caller 20.

The AP 314 may operate an application execution environment (VENGINE) 320 to run the destination application 32. Also, the AP 314 may run multiple customer service-related computer applications 322 executed to provide various services that may be requested by the caller 20. For example, the applications 322 may include tutorials for providing information requested by the caller 20 and self-service applications that enables the caller to obtain a requested service or information. The MPS 310 may be connected to a private branch exchange (PBX) 324 for routing calls to an agent 326. Some selected destinations would be the applications 322, whereas other destinations would be phones or terminals of agents 326.

Network interfaces 328, 330, 332 and 334 may be provided for interfacing the speech server 304 with the TMS 312 and the AP 314. The speech server 304 and the MPS 310 may be connected over an external local area network (LAN) 336. The TMS 312 and the AP 314 may be connected over an internal LAN 338.

When the caller 20 makes a call, the network 316 delivers the call to a port on the MPS 310. Incoming audio from the call is delivered to the DCC board 318 which produces decoded audio data representing the caller's words. The DCC board 318 passes the audio data via the network interfaces 328 and 332 to the RAM 302. At the same time, a request for a speech resource is transferred from the AP 314 via the interfaces 330 and 334 to the recognition engine 16. In response, the CPU 308 executes instructions of the recognition engine 16 to analyze the audio data based on the grammar 306 so as to determine the destination for routing the call as discussed earlier. Via the interfaces 330 and 334, the destination determined by the ECMA script interpreter 28 is provided to the application 32. If the destination is an agent queue, the application 32 may route the call to the agent 326 via the PBX 324. If the destination is a self-service application or tutorial, the application 32 launches an appropriate application for handling the call.

As discussed above, the use of an SSM requires manually re-tagging a large corpus of utterances. In accordance with the present disclosure, no re-tagging is required—only the modification of the robust-parsing grammars and the rules tables. This translates into a savings of several hours to a few days of labor.

Further, training of a single large SSM takes many hours of machine time. In accordance with the present disclosure, SSM training is not required. Regenerating the rules engine and re-compiling steps discussed above take only a few minutes. The time savings are even greater considering that the system of the present disclosure uses several different call routing grammars.

Moreover, the effectiveness of SSM technology depends upon statistics drawn from historical data (caller speech).

When new devices or technology are introduced, there is little or none of this data available. Therefore, enhancing the SSM requires adding 'fake' data and guessing the quantities. This procedure is not required in the method of the present disclosure. In addition, the present disclosure makes it possible to substantially reduce the grammar size.

The functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Aspects of the techniques outlined in this disclosure may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into another computer platform. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the techniques discussed in this disclosure. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the above discussion primarily refers to processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions.

In this specification, the term "software" is meant to include firmware residing in read-only memory or applications stored in magnetic storage, which can be read into memory for processing by a processor. Also, in some implementations, multiple software operations can be implemented as sub-parts of a larger program while remaining distinct software operations. In some implementations, multiple software operations can also be implemented as separate programs. Finally, any combination of separate programs that together implement a software invention described here is within the scope of the invention. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A call router comprising:
   a memory storing program instructions and a rule set;
   a telephone interface configured to receive a speech signal representing words spoken by a caller;
   a processor coupled to the memory and the telephone interface, wherein the processor is configured to perform functions in response to executing the programming instructions stored in the memory, including functions of:
   in response to the received speech signal, produce recognized text having words representative of the spoken words;
   detect a class of the words in the recognized text, wherein the class is a group of words having a common attribute and each class of words is assigned a weight;
   in response to detection of a combination of classes in the recognized text, identify rules that contain matches to the combination of classes detected in the recognized text from among multiple rules defining destinations for different combinations of classes;
   select a rule from the identified rules based on a number of detected classes and a corresponding sum of the weights assigned to the classes in the combination of classes in the recognized text;
   interpret the selected rule to identify a destination for routing the call; and
   route the call to the identified destination.

2. The call router of claim 1, wherein the processor is configured to perform additional functions, including functions to detect multiple classes of words in the recognized text.

3. The call router of claim 2, wherein the classes are represented by types of classes including action, device, product and feature.

4. The call router of claim 2, wherein the classes are assigned with different priorities.

5. The call router of claim 2, wherein the processor is configured to perform additional functions, including functions to detect the classes based on class definitions including words defined for each class.

6. The call router of claim 5, wherein the processor is configured to perform additional functions, including functions to recognize the words using a class-based statistical language model (SLM) trained based on the class definitions.

7. The call router of claim 2, wherein the processor is configured to perform additional functions, including functions to determine the destination based on a rule that defines a single destination based on one or more classes detected in the recognized text.

8. The call router of claim 7, wherein the processor when performing the function of selecting a rule from the identified rules, the processor performs additional functions, including functions to select the rule from among multiple rules defining destinations for different combinations of classes, the rule being selected based on a count corresponding to the sum of weights assigned to the classes defined in the rule.

9. The call router of claim 1, wherein the processor is configured to perform additional functions, including functions to recognize the words spoken in natural language.

10. The call router of claim 1, wherein the processor is configured to perform additional functions, including functions to is responsive to calls transmitted over a wireless network.

11. An article of manufacture comprising:
a non-transitory machine readable storage medium; and
executable code for a call router embodied in the medium, wherein execution of the code by a processor causes the call router to implement functions comprising:
recognizing words spoken by a caller in a natural language to produce recognized text having words representative of the spoken words;
detecting classes of words in the recognized text, each class being a group of words having a common attribute and each class of words is assigned a weight;
in response to detection of a combination of classes of words in the recognized text, identifying rules that contain matches to the combination of classes of words detected in the recognized text from among multiple rules defining destinations for different combinations of classes;
selecting a rule from the identified rules based on a number of detected classes and a corresponding sum of the weights assigned to the classes in the combination of classes in the recognized text; and
determining a destination for routing the call in accordance with the selected rule.

12. The article of claim 11, wherein the executable code causes the call router to detect the classes based on class definitions including words relating to each class.

13. The article of claim 11, wherein the classes are represented by types of classes including action, device, product and feature.

14. The article of claim 12, wherein the executable code causes the call router to recognize the words using a class-based statistical language model (SLM) trained based on the class definitions.

15. A method, comprising steps of
recognizing, by a speech recognizer, words spoken by a caller in a natural language to produce recognized text;
detecting, by a robust parser, classes of words in the recognized text based on class definitions for each class including a group of words having a common attribute and each class of words is assigned a weight;
in response to detection of a combination of classes of words in the recognized text, identifying rules that contain matches to the combination of classes of words detected in the recognized text from among multiple rules defining destinations for different combinations of classes;
selecting a rule from the identified rules based on a number of detected classes and a corresponding sum of the weights assigned to the classes in the combination of classes in the recognized text; and
determining the destination for routing the call in accordance with the selected rule.

16. The method of claim 15, further comprising calculating a weight of the rule based on the weight of the classes included in the rule.

17. The method of claim 16, further comprising assigning priorities to each class, and computing the weight of a class based on a priority assigned to that class.

18. The call router of claim 1, wherein, when selecting a rule from the identified rules, the processor performs additional functions, including functions to:
compare a number of classes in the identified rules to the number of detected classes in the combination to a corresponding sum of the weights assigned to the classes in the combination of classes in the recognized text; and
based on the number of classes being less than the sum of the weights, select a rule that has the highest sum of the weights.

* * * * *

UNITED STATES PATENT AND TRADEMARK OFFICE
CERTIFICATE OF CORRECTION

| | | |
|---|---|---|
| PATENT NO. | : 8,942,981 B2 | Page 1 of 1 |
| APPLICATION NO. | : 13/284276 | |
| DATED | : January 27, 2015 | |
| INVENTOR(S) | : Veronica Klein et al. | |

It is certified that error appears in the above-identified patent and that said Letters Patent is hereby corrected as shown below:

In the claim

Column 14, lines 64-66, Claim 10 should read as follows:

The call router of claim 1, wherein the processor is responsive to calls transmitted over a wireless network.

Signed and Sealed this
Twenty-first Day of April, 2015

Michelle K. Lee
*Director of the United States Patent and Trademark Office*